United States Patent
Moulsley

(10) Patent No.: US 9,426,671 B2
(45) Date of Patent: Aug. 23, 2016

(54) METHOD FOR COMMUNICATING IN A MOBILE NETWORK DURING A TRANSITIONAL CONFIGURATION MODE

(75) Inventor: Timothy James Moulsley, Caterham (GB)

(73) Assignee: Koninklijke Philips N.V., Eindhoven (NL)

(*) Notice: Subject to any disclaimer, the term of this patent is extended or adjusted under 35 U.S.C. 154(b) by 855 days.

(21) Appl. No.: 13/635,689

(22) PCT Filed: Mar. 31, 2011

(86) PCT No.: PCT/IB2011/051376
§ 371 (c)(1),
(2), (4) Date: Sep. 18, 2012

(87) PCT Pub. No.: WO2011/125004
PCT Pub. Date: Oct. 13, 2011

(65) Prior Publication Data
US 2013/0021948 A1    Jan. 24, 2013

(30) Foreign Application Priority Data

Apr. 7, 2010   (EP) .................................... 10305357
Apr. 29, 2010  (EP) .................................... 10305456

(51) Int. Cl.
*H04L 12/26* (2006.01)
*H04W 24/02* (2009.01)
*H04W 72/00* (2009.01)

(52) U.S. Cl.
CPC .............. *H04W 24/02* (2013.01); *H04W 72/00* (2013.01)

(58) Field of Classification Search
USPC ......... 370/229, 230, 235, 236, 252, 328, 329, 370/331
See application file for complete search history.

(56) References Cited

U.S. PATENT DOCUMENTS

| | | | |
|---|---|---|---|
| 8,359,039 B2 * | 1/2013 | McBeath | H04L 5/001 370/328 |
| 2011/0021206 A1 * | 1/2011 | Baker et al. | 455/450 |
| 2011/0085513 A1 * | 4/2011 | Chen et al. | 370/330 |

(Continued)

FOREIGN PATENT DOCUMENTS

| WO | 2009118703 A1 | 10/2009 |
|---|---|---|
| WO | 2011053857 A1 | 5/2011 |

OTHER PUBLICATIONS

"UE Assignment Methods During CIF Configuration", 3GPP TSG RAN WG1 Meeting #69, NTT DOCOMO, Inc, R2-101537, February 22-26, 2010, p. 1-5.

(Continued)

*Primary Examiner* — Kwang B Yao
*Assistant Examiner* — Nguyen Ngo

(57) ABSTRACT

The present invention relates to a method for communicating between a primary station and at least one secondary station, comprising (a) the secondary station being configured to search a first configuration of search spaces, said search spaces comprising a number of resource sets, where at least one resource set might be used to transmit a message to the secondary station, (b) configuring the secondary station by means of a configuration message to search a second configuration of search spaces, (c) the secondary station in response of the reception of the configuration message entering into a transitional configuration mode, wherein the secondary station searches partly the first configuration of search spaces and the second configuration of search spaces.

15 Claims, 3 Drawing Sheets

(56) References Cited

U.S. PATENT DOCUMENTS

| | | | |
|---|---|---|---|
| 2011/0134774 A1* | 6/2011 | Pelletier et al. | 370/252 |
| 2012/0009923 A1* | 1/2012 | Chen et al. | 455/434 |
| 2012/0320838 A1* | 12/2012 | Yang et al. | 370/329 |
| 2013/0021989 A1* | 1/2013 | Tiirola et al. | 370/329 |
| 2013/0039188 A1* | 2/2013 | Larsson | H04L 5/0053 370/241 |
| 2013/0070709 A1* | 3/2013 | Wang et al. | 370/329 |
| 2013/0155969 A1* | 6/2013 | Moon et al. | 370/329 |
| 2014/0036859 A1* | 2/2014 | Ekpenyong et al. | 370/330 |
| 2014/0269585 A1 | 9/2014 | Earnshaw et al. | |

OTHER PUBLICATIONS

"RRC Reconfiguration Issue at Cross-Carrier Scheduling for CA", 3GPP TSG RAN WG1 Meeting #60BIS, Huawei, April 12-16, 2010, p. 1-6.

"Interpreting the Carrier Indicator Field", 3GPP TSG RAN WG1 #60BIS, Qualcomm Incorporated, April 12-16, 2010, p. 1-3.

Panasonic, "Further Discussion on PDCCH With Cross Carrier Operation", 3GPP TSG-RAN WG1 Meeting #59BIS, Valencia, Spain, R1-100361, January 2010, p. 1-6.

* cited by examiner

METHOD FOR COMMUNICATING IN A MOBILE NETWORK DURING A TRANSITIONAL CONFIGURATION MODE

FIELD OF THE INVENTION

The present invention relates to a method for communicating in a network. More specifically, the present invention relates to communication between a primary station and a secondary station, in a telecommunication network, like a cellular telecommunication network (e.g. UMTS, GSM).

BACKGROUND OF THE INVENTION

In UMTS LTE the downlink control channel PDCCH (Physical Downlink Control Channel) carries information such as resource allocation for uplink or downlink transmission. A PDCCH message can use 1, 2, 4 or 8 Channel Control Elements (CCEs or resource elements)—referred to as CCE aggregation levels 1, 2, 4 or 8. PDCCH messages can be transmitted using one of a set of available message formats (e.g. with different signal characteristics such as number of information bits and channel coding rate, The different formats are refereed to in the LTE specifications as "DCI formats". In addition, different destinations or purposes for the PDCCH messages may be indicated by different scrambling sequences applied to the message CRC (in the LTE specifications the different scrambling sequences correspond to different identities, referred to as RNTIs). Different RNTIs are used to distinguish UE-specific PDCCH messages intended for a particular UE, from Common PDCCH messages intended for reception by more than one UE. In the case of a PDCCH message intended for reception by more than one UE, this could be for a defined group of UEs, or any UE.

A mobile station, like a UE in LTE, does not know in advance the location in CCE space of messages intended for it. In principle, the mobile station could attempt to blindly decode all the possible PDCCHs with different starting positions in the CCE space and thus receive any messages intended for that mobile station. However, if the CCE space is large the processing complexity is prohibitive. Therefore a more limited search is configured which consists of a number of search spaces. A UE may search a given search space for messages with one of more DCI formats. For simplicity of explanation, we may consider only one DCI format and one RNTI in a UE-specific search space, but the same discussion is applicable for multiple DCI formats, multiple RNTIs and for UE-specific and Common search spaces.

A search space is a set of aggregated CCEs (with a certain aggregation level) within which a mobile station (or user equipment (UE) or secondary station) performs blind decoding of all PDCCH payloads (DCI formats and RNTIs) that it assumes may be transmitted for that aggregation level. The set of PDCCH payloads that the UE assumes may be transmitted may be a subset of all possible PDCCH payloads defined by the LTE specification. Search spaces are defined per aggregation level; a secondary station thus can have up to four search spaces. For example, the search space of a UE for aggregation level 1 (referred to as 1-CCE) could consist of the CCEs indexed 3,4,5,6,7,8, while its search space for aggregation level 8 could consist of the two resource sets of aggregated CCEs consisting of the CCEs indexed by 1,2, . . . 8 and 9,10, . . . ,16, respectively. In this example, the UE thus performs six blind decodings for 1-CCEs and two blind decodings for 8-CCEs.

The LTE specification currently requires the UE to perform the following in the search spaces designed for UE-specific PDCCH messages on a single carrier (i.e. UE-specific search space (UESSS)):
 6 decoding attempts of 1-CCE aggregation
 6 decoding attempts of 2-CCE aggregation
 2 decoding attempts of 4-CCE aggregation
 2 decoding attempts of 8-CCE aggregation In addition the UE is required to perform the following in a search space designed for Common PDCCH messages on a single carrier (i.e. Common search space):
 4 decoding attempts of 4-CCE aggregation
 2 decoding attempts of 8-CCE aggregation In a conventional wireless system represented on FIG. 1, a primary station 100 exchanges data with a plurality of secondary stations 110. To transmit its data, the primary station 100 transmits sends its data on a downlink data channel 101. This downlink data channel may be adjusted over time in response to several criteria, e.g. Quality of Service, interference, downlink channel quality. To inform the secondary stations 110 of these changes, the primary station 100 transmits control data (or signalling) to the secondary stations 110 on a downlink control channel 102. Similarly, the secondary stations 110 transmit their data on an uplink control channel 111. Moreover, an uplink control channel 112 is used by the secondary station to request resources for transmissions and/or for providing the primary station with feedback on the downlink transmissions or on the channel quality state.

In many wireless systems, like mobile communication systems as UMTS LTE (Long Term Evolution), or LTE Advanced, signalling on control channels 102 or 112 is provided so that it indicates the particular time-frequency transmission resources to which the data is mapped on the data channels 101 or 111, and the transmission scheme used for that data (i.e. the format/mode in which the data itself is transmitted). In addition the secondary station may provide channel state feedback intended to assist the primary station in scheduling transmission to suitable secondary stations using appropriate transmission resources and transmission scheme. Therefore, in general a transmission mode may be defined by one or both of a transmission scheme used by the primary station or the type of feedback provided by the secondary station.

For UMTS LTE downlink communication, the relevant downlink control channel 101 that includes resource allocation and transmission format information is known as Physical Downlink Control Channel (PDCCH). The message a PDCCH carries is known as Downlink Control Channel Information (DCI). The resource allocations for different transmission modes are typically indicated using different DCI formats. The secondary station (here a User Equipment or UE) is configured to receive a limited number of different DCI formats from the possible set. Therefore configuring the types of DCI format expected by the UE in the PDCCH directly controls the transmission modes which may be expected by the secondary station, and a particular transmission mode is signalled by the particular DCI format used for resource allocation. The DCI Format contents can also be associated with a transmission mode (e.g. in LTE a 1 bit field indicated uplink or downlink resources).

The following PDCCH properties may be configured/reconfigured at the secondary station by higher layer signalling from the primary station:—
 DCI formats (depending on transmission mode)
 DCI format size (e.g. addition/removal of CIF field)
 PDCCH Search spaces Carriers (additional CCs for carrier aggregation, anchor carrier, or handover).

However, because of the delays inherent in higher layer (RRC) signalling the primary station does not know exactly when the secondary station applies the new configuration. Therefore, there is a possibility that a PDCCH message (e.g. with a particular new DCI format) may be transmitted by the eNB, but not received by the UE (either because it has not yet applied the reconfiguration). Similarly PDCCH messages may be lost if the new configuration is applied earlier than expected by the eNB.

SUMMARY OF THE INVENTION

It is an object of the invention to propose a method of communication which alleviates the above mentioned problem.

It is another object of the invention to provide a method enabling the secondary station to receive DCIs, even though a request for a change of format has been received.

It is another object of the invention to avoid losing PDCCH messages (particularly those indicating RRC signalling messages) without increasing complexity (e.g. number of blind decodings).

To this end, in accordance with the invention, a method is proposed for communicating between a primary station and at least one secondary station, comprising (a) the secondary station being configured to search a first configuration of search spaces, said search spaces comprising a number of resource sets, where at least one resource set might be used to transmit a message to the secondary station, (b) configuring the secondary station by means of a configuration message to search a second configuration of search spaces, (c) the secondary station in response of the reception of the configuration message entering into a transitional configuration mode, wherein the secondary station searches partly the first configuration of search spaces and the second configuration of search spaces.

The present invention also relates to a secondary station comprising means for communicating with a primary station, the secondary station being configured to search a first configuration of search spaces, said search spaces comprising a number of resource sets, where at least one resource set might be used to transmit a message to the secondary station, a receiver for receiving a configuration message for configuring the secondary station to search a second configuration of search spaces, control means for configuring the secondary station in response to the reception of the configuration message to enter into a transitional configuration mode, wherein the secondary station searches partly the first configuration of search spaces and the second configuration of search spaces.

In accordance with still another aspect of the invention, a primary station is proposed, the primary station comprising means for implementing a method in accordance with the first aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein.

DETAILED DESCRIPTION OF THE INVENTION

The present invention relates to a method for communicating in a network, like a cellular network. For instance, the network may be a UMTS network as depicted on FIG. 1.

Figure 1:
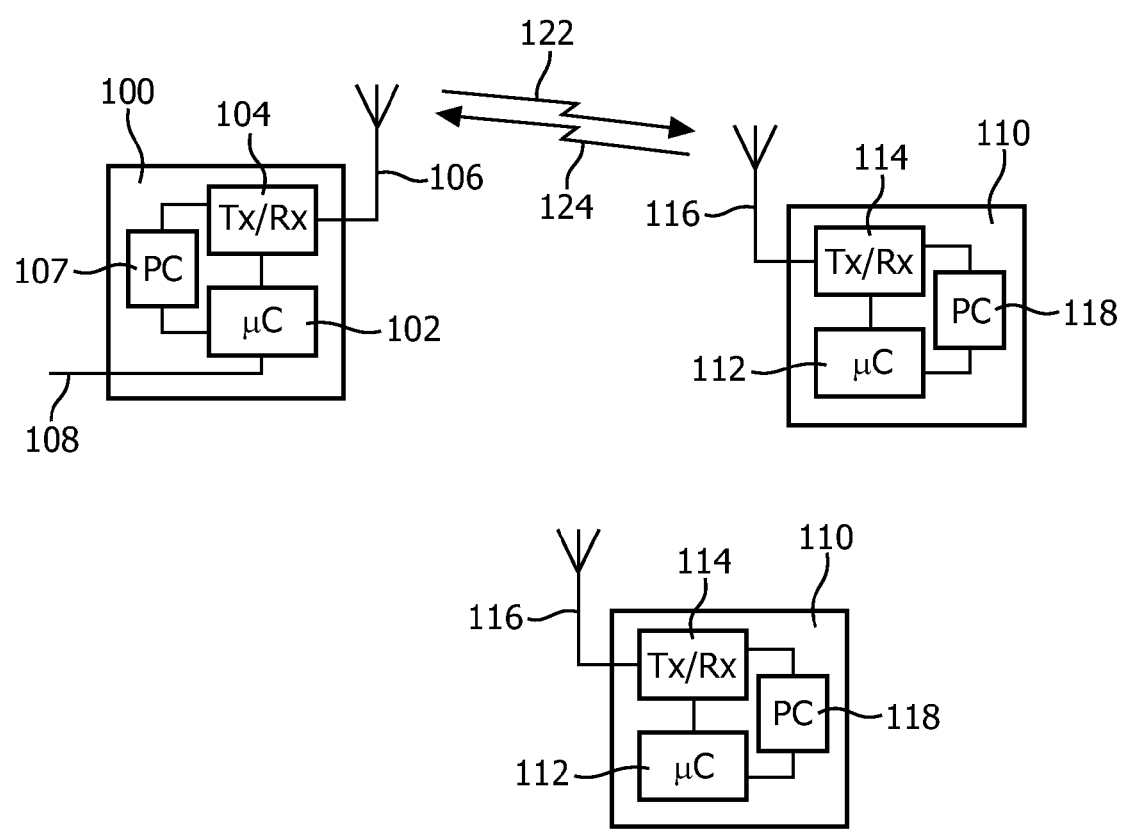
FIG. 1 is a block diagram of a system in accordance with the invention comprising a primary station and at least a secondary station.

Referring to FIG. 1, a radio communication system in accordance with the invention comprises a primary station (BS or eNodeB) 100 and a plurality of secondary stations (MS or UE) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each UE 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on downlink channels, while communication from secondary station 110 to primary station 100 takes place on uplink channels. In this example, the downlink channels comprise control channels, like PDCCH. Such control channels may be transmitted over a plurality of carriers. These carriers may be defined by frequency carriers or in a variant of the invention, coding modulation.

In such a system, the DCIs may have a plurality of formats, each dedicated to one transmission mode.

The Physical Downlink Control Channel (PDCCH) serves a variety of purposes. Primarily, it is used to convey the scheduling decisions to individual UEs, i.e. scheduling assignments for uplink and downlink. The PDCCH is located in the first OFDM symbols of a subframe. For frame structure type 2, PDCCH can also be mapped onto the first two OFDM symbols of DwPTS field. An additional Physical Control Format Indicator Channel (PCFICH) carried on specific resource elements in the first OFDM symbol of the subframe is used to indicate the number of OFDM symbols for the PDCCH (1, 2, 3, or 4 symbols are possible). PCFICH is needed because the load on PDCCH can vary, depending on the number of users in a cell and the signaling formats conveyed on PDCCH.

As explained above, the information carried on PDCCH is referred to as downlink control information, or DCI. Depending on the purpose of the control message, different formats of DCI are defined. As an example, the contents of DCI format 1 are shown in the Table 1 below as an example. DCI format 1 is used for the assignment of a downlink shared channel resource when no spatial multiplexing is used (i.e. the scheduling information is provided for one code word only). The information provided contains everything what is necessary for the UE to be able to identify the resources where to receive the PDSCH in that subframe and how to decode it. Besides the resource block assignment, this also includes information on the modulation and coding scheme and on the hybrid ARQ protocol.

TABLE 1

Contents of DCI format 1 carried on PDCCH

| Information type | Number of bits on PDCCH | Purpose |
| --- | --- | --- |
| Resource allocation header | 1 | Indicates whether resource allocation type 0 or 1 is used |
| Resource block assignment | Depending on resource allocation type | Indicates resource blocks to be assigned to the UE |
| Modulation and coding scheme | 5 | Indicates modulation scheme and, together with the number of allocated physical resource blocks, the transport block size |
| HARQ process number | 3 (TDD), 4 (FDD) | Identifies the HARQ process the packet is associated With |
| New data indicator | 1 | Indicates whether the packet is a new transmission or a retransmission |
| Redundancy version | 2 | Identifies the redundancy version used for coding the packet |
| TPC command for PUCCH | 2 | Transmit power control (TPC) command for adapting the transmit power on the Physical Uplink Control Channel (PUCCH) |
| Downlink assignment index (TDD only) | 2 | number of downlink subframes for uplink ACK/NACK bundling |

The Cyclic Redundancy Check (CRC) of the DCI is scrambled with the UE identity that is used to address the scheduled message to the UE.

For each transmission mode corresponds a DCI format. For example, DCI format 1A is used for compact signalling of resource assignment of single codeword PDSCH transmissions. DCI format 1B is used for compact signalling of resource assignment of PDSCH transmissions using closed loop precoding with rank 1 transmission. Similarly there is DCI format 1D for MU-MIMO transmission on the PSDCH. The exhaustive list of DCI formats is omitted for the sake of conciseness.

DCI (Downlink Control Information) format 0 is used on PDCCH to convey the uplink scheduling grant, is shown in table 2 below.

TABLE 2

Contents of DCI format 0

| Information type | Number of bits on PDCCH | Purpose |
| --- | --- | --- |
| Flag for format 0/format1A differentiation | 1 | Indicates DCI format to UE |
| Hopping flag | 1 | Indicates whether uplink frequency hopping is used or not |
| Resource block assignment and hopping resource allocation | Depending on resource allocation type | Indicates whether to use type 1 or type 2 frequency hopping and index of starting resource block of uplink resource allocation as well as number of contiguously allocated resource blocks |
| Modulation and coding scheme and redundancy version | 5 | Indicates modulation scheme and, together with the number of allocated physical resource blocks, the transport block size. Indicates redundancy version to use |

TABLE 2-continued

Contents of DCI format 0

| Information type | Number of bits on PDCCH | Purpose |
| --- | --- | --- |
| New data indicator | 1 | Indicates whether a new transmission shall be sent |
| TPC command for scheduled PUSCH | 2 | Transmit power control (TPC) command for adapting the transmit power on the Physical Uplink Shared Channel (PUSCH) |
| Cyclic shift for demodulation reference signal | 3 | Indicates the cyclic shift to use for deriving the uplink demodulation reference signal from the base sequence |
| Uplink index (TDD only) | 2 | Indicates the uplink subframe where the scheduling grant has to be applied |
| CQI request | 1 | Requests the UE to send a channel quality indication (CQI) |

In accordance with the embodiments of the invention, it is recognised that during the reconfiguration process it may be acceptable to lose some flexibility in scheduling in order that the primary station (or eNB) and the secondary station (or UE) can reliably communicate. In accordance with a current definition of the invention, this requires that the UE should be able to receive PDCCH messages according to both old and new configurations, but with some loss in flexibility. Two particular embodiments are considered: Reducing the effective size of the search space for each configuration and reducing the fraction of time for which each configuration is available.

(1) If the use of a new DCI format (or change in CIF (CIF is Carrier Indicator Flag (A 3 bit indicator of which carrier the is meant for the granted resource signalled in the DCI))) is configured to replace an existing DCI format then the UE specific search space is split so that some of the search space is allocated for the old DCI format and some of the search space is allocated to the new DCI format (e.g. the first half of the search space for the old and second the half for the new). The whole of the search space is used for the new DCI format when the reconfiguration is confirmed or after expiration of a timer. This first embodiment is shown on FIG. 2 for example described hereafter.

(2) Alternatively, UE specific search space is reserved for the old DCI format on some subframes, and reserved for the new DCI format in other subframes (e.g. odd subframes for the old, and even subframes for the new). All subframes are used for the new DCI format when the reconfiguration is confirmed or after expiration of a timer. This second embodiment is shown on FIG. 3 for example described hereafter.

With respect to the CIF, when cross carrier scheduling is configured, each grant will also contain this Carrier Indicator Flag (CIF) to indicate which carrier the grant applies to.

The CIF field is added to the existing Rel-8/Rel-9 DCI format (and new formats introduced in Rel-10). In general, per carrier scheduling has the following advantages: a) allows different DCI formats to the same UE on different component carriers; and b) facilitates dynamic load balancing among the component carriers on a sub-frame basis.

These two solutions ((1) and (2) above) enable the eNB to continue to use the old configuration for important data such as RRC messages (until the new configuration is confirmed or until a timer expired), but can switch to using the new configuration for user data when appropriate. If some user date is lost, this can typically be recovered by other means if necessary.

The first and second embodiments (1) and (2) can be applied if the UE-specific search space itself changed (e.g. to accommodate scheduling on new carriers). In the first embodiment, this would mean that the UE searches part of the old search space and part of the new search space. These two parts could be preconfigured or signalled when the new DCI format is signalled. In the second embodiment, this would mean that the old search space is used in some subframes and the new search space is used in other subframes.

It is to be noted that the first and second embodiments (1) and (2) can as well be applied if the carrier on which PDCCH is to be monitored is changed (e.g. handover, change of anchor carrier). For example, the first embodiment can be used provided it is within the UE capability to monitor PDCCH on two carriers at the same time. The second embodiment would require monitoring PDCCH on different carriers in different subframes.

In an example of these embodiments is a system like LTE-A. When a reconfiguration occurs which would affect the DCI format used for RRC messages (e.g. adding removing a CIF field), the UE enters into a transitional phase during which it uses partly the old format and the new format. This partition can be one of the above explained embodiments (1) or (2). The amount of search space or which subframes are used for old and new DCI formats is predetermined. This could be by signalling or fixed by specification. The new configuration is fully applied when the reconfiguration is confirmed (e.g. by RRC signalling). In a variant, the new configuration is fully applied after expiration of a timer. The timer duration may be set by signalling or fixed by specification.

In a variant, the transitional state of the secondary station where it monitors partly the old configuration expires as soon as a message is received in accordance with the new configuration. Indeed, this reception would mean that the primary station has also entered in the transitional configuration mode, and thus, the secondary station may not need to waste resources or energy in decoding the old configuration messages. The primary station may continue to transmit in this mode for a predetermined duration if the secondary station does not signal that it has switched to the new configuration mode.

Figure 2:
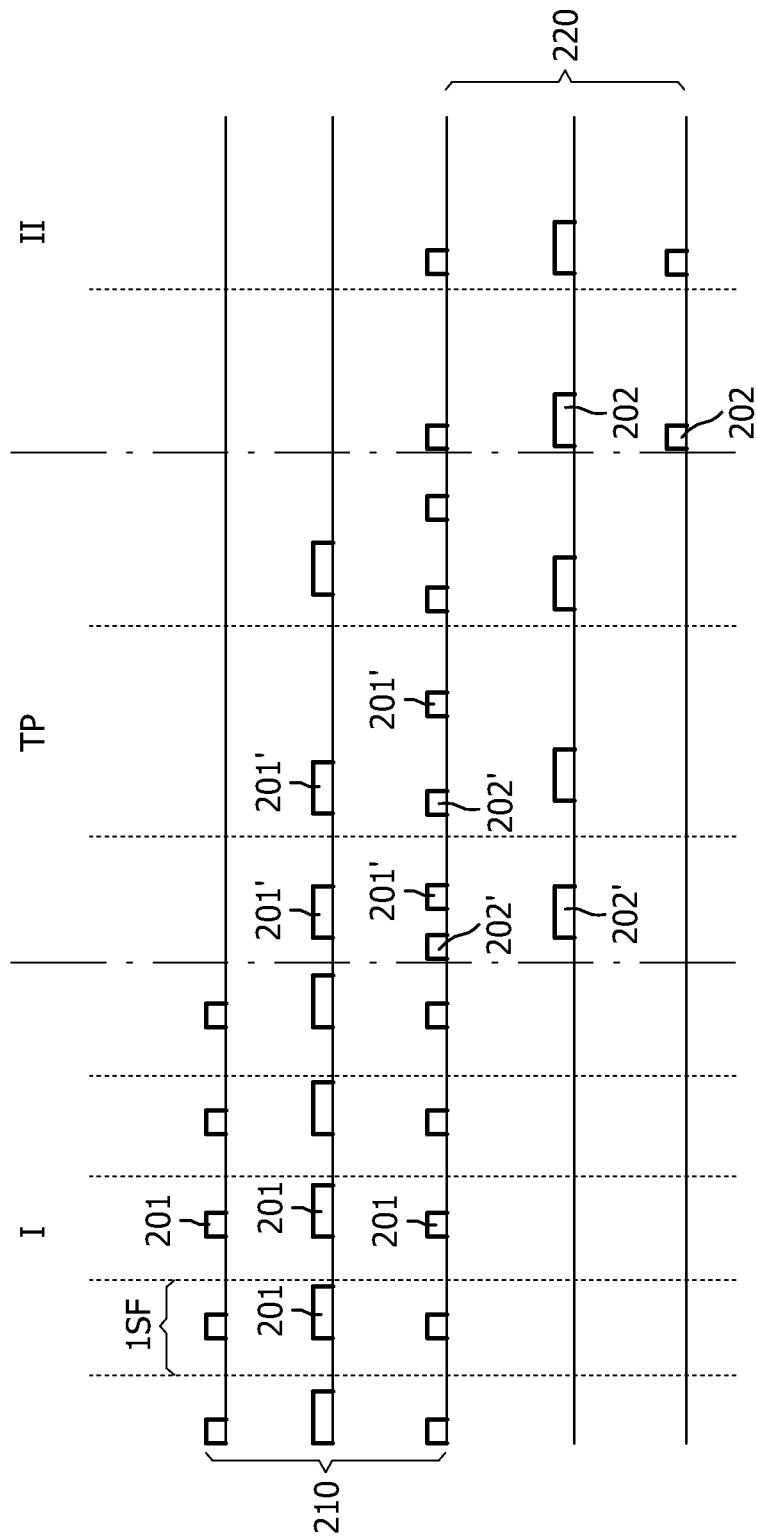
FIG. 2 is a time chart representing schematically a PDCCH in a first embodiment of the invention.

As can be seen on the example of FIG. 2, for a considered secondary station, the search spaces 201 in the first configuration mode I are for example on a first set of carriers 210, although the search spaces 202 on a second set of carriers 220 for the second configuration mode II. For the sake of clarity of representations, the difference between the two modes is in the sets of carriers. However, these embodiments are not limited to this kind of difference which could be any of those parameters defining the formats. During the transitional configuration phase TP, starting with the reception of a configuration message, the secondary station searches on a portion 201' of the search spaces 201 on carriers 210 and on a portion 202' of the search spaces 202 simultaneously, i.e. during the same subframe SF. These portions may be a subset of the subspaces that are searched in the normal configuration mode as illustrated. But these may as well be portions of these subspaces. Moreover, it can happen, depending on the situation of the portions of search spaces, that the secondary station listens to both sets of carriers 210 and 220 at the same time. When the transitional configuration phase TP expires, for example after a predetermined duration or after the reception of a message in the second configuration search spaces, the secondary station listens to all the search spaces of the second configuration. It is to be noted that in this example the secondary station only listens to a portion of the second configuration search spaces in the TP. However, in a variant of this embodiment, it can listen partly to the first configuration search spaces and to the whole set of search spaces of the second configuration.

Figure 3:
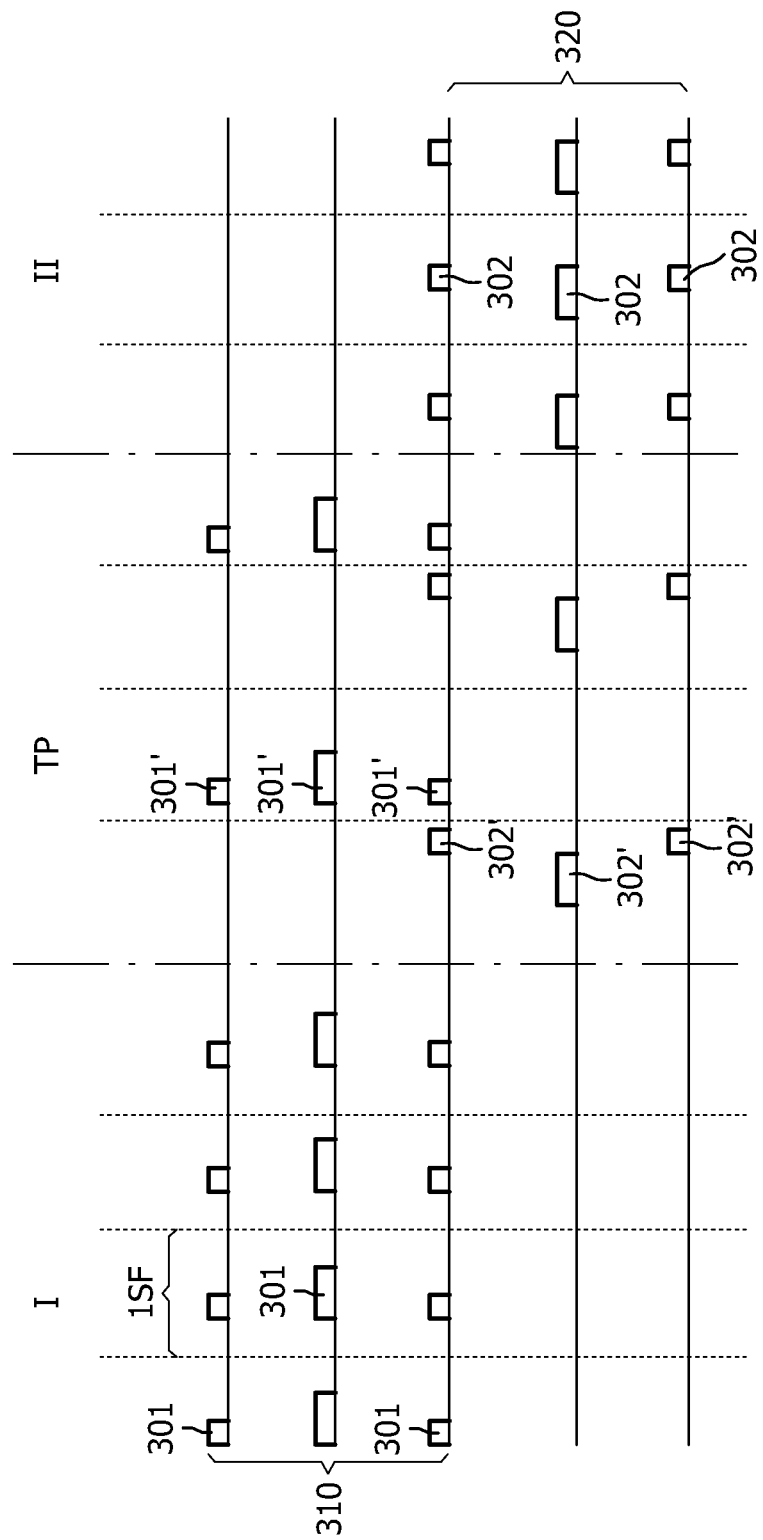
FIG. 3 is a time chart representing schematically a PDCCH in a second embodiment of the invention.

An example of the second embodiment is described on FIG. 3. As can be seen on the example of FIG. 3, for a considered secondary station, the search spaces 301 in the first configuration mode I are for example on a first set of carriers 310, although the search spaces 302 on a second set of carriers 320 for the second configuration mode II. During the transitional configuration phase TP, starting with the reception of a configuration message, the secondary station searches the search spaces 301' on carriers 310 in some subframes and the search spaces 302' during the remaining subframes. Thus, in this particular example, the secondary station listens to only one set of carriers 210 and 220 at the same time, or even in the same subframe. This transitional configuration mode may then be preferred for secondary stations not being able to listen to so many carriers at the same time. When the transitional configuration phase TP expires, for example after a predetermined duration or after the reception of a message in the second configuration search spaces, the secondary station listens to all the search spaces of the second configuration. It is to be noted that in this example the secondary station only listens to the second configuration search spaces in some subframes, e.g. the odd numbered subframes of the TP. However, in a variant of this embodiment, it can listen to the first configuration search spaces in some subframes only and to the whole set of search spaces of the second configuration in every subframe of the TP.

Until the reconfiguration is completed the primary station can send a PDCCH message according to the old format in the appropriate part of the search space or appropriate subframe. The primary station may thus send the signal twice during the TP, once in the first configuration part of the TP and once in the second configuration part of the TP.

Further variations of the above embodiments are possible. In these variants, the primary station initiates the reconfiguration by the transmission of a RRCConnectionReconfiguration message via RRC signalling (or other higher signalling). On reception of this message, and once the secondary station has completed the reconfiguration, it transmits to the primary station an RRCConnectionReconfigurationComplete message via higher layer signalling. If the primary station does not receive the RRCConnectionReconfigurationComplete message, retransmissions of the RRCConnectionReconfiguration message may be carried out. Only on reception of this RRCConnectionReconfigurationComplete message, is the primary station sure that the secondary station has finished its reconfiguration.

In a first variant of these embodiments, one of the first or second configurations of search spaces comprises that no CIF is provided for all DCI formats for same-carrier scheduling in UE-specific search space. The CIF is not attached for scheduling on the same carrier. Then, RRC signalling can be handled even during CIF initialization/release procedures. This option can be applied for all CCs or at least one CC.

In another variant of these embodiments, one of the first or second configurations is that no CIF is attached for DCI format 0/1A for same-carrier scheduling in UE-specific search space, although other DCI formats have CIF. In Rel-8, DCI formats 0/1A are defined for fallback mode operations, and in the same manner, only DCI format 0/1A can be used during uncertain CIF initialization/release periods. The advantage compared to the first variant is more possibility for BD (blind decoding) reduction. For example, among two sets of DL and UL blind decoding attempts, DL DCI formats with CIF can have a unified size with other DL DCI formats for cross-carrier scheduling, and this could help to reduce the blind decoding attempts in the shared search space by K, where K is the number of PDCCH candidate positions in a given search space.

In accordance with a further variation of the above embodiments, it is proposed to delay the reconfiguration of CIF until after the RRCConnectionReconfigurationComplete message is transmitted by the UE. This allows a common understanding at the UE and eNB that the PDCCH with resource allocation for the RRCConnectionReconfigurationComplete message (and any retransmissions of the RRCConnectionReconfiguration message) will be transmitted without CIF. This has some possible disadvantages like:

Additional delay in applying the reconfiguration;
Because of HARQ operation, there is some uncertainty on exactly when the RRCConnectionReconfigurationComplete message will be received by the eNB;
This violates the general 15 ms timing requirement for the UE to implement reconfigurations.

In a similar variation of the above embodiments, it is possible to delay the reconfiguration of CIF for Format 0/1A until after the RRCConnectionReconfigurationComplete message is transmitted by the UE. The reconfiguration for other DCI formats than Format 0/1A is available with no delay. In some cases there could be confusion in the UE-specific search space between Format 0/1A without CIF and other DCI formats with CIF having the same size. This has some possible disadvantage since there would potentially be ambiguity problems with DCI formats with CIF having the same size as DCI formats 0/1A without CIF (e.g. if CCs have different bandwidths). To avoid ambiguity a scheduling restriction (during reconfiguration) or padding solution can be considered.

In accordance with a further variation of the above embodiments, it is proposed to apply the reconfiguration of CIF to some of the UE-specific search space immediately, but delay the reconfiguration of CIF for the remaining part of the search space until a DCI format is received with the new value of CIF. This allows the resource allocation for the RRCConnectionReconfigurationComplete message (and any retransmissions of the RRCConnectionReconfiguration message) to be transmitted with or without CIF (in the appropriate part of the search space). It also allows cross-carrier scheduling according to the new configuration with minimal delay. This may under some conditions cause the following:

Some reduction in scheduling flexibility while the search space is split.
Some uncertainty at the eNB on when the UE first correctly receives a DCI format with the new value of CIF. However, the eNB may continue using only part of the search space until it is sure that the UE has applied the new configuration to the whole search space.

In still another variant of the above embodiments, the secondary station monitors for DCI format 0/1A both with and without CIF (in UESSS) until format 0/1A is received with the new value of CIF. This allows the resource allocation for the RRCConnectionReconfigurationComplete message (and any retransmissions of the RRCConnectionReconfiguration message) to be transmitted whether the eNB uses Format 0/1A with or without CIF. Minimal other specification changes would be needed. This solution has some possible disadvantage: This solution implies additional blind decodes for monitoring for both versions of Format 0/1A, but fewer additional blind decodes than would be required for monitoring for both versions of all configured DCI formats. However, this additional processing is likely to be within the capability of a UE supporting carrier aggregation. However, if not, then the total number of blind decodes could be maintained by restricting any scheduling using other DCI formats for the newly configured carrier during the TP of the reconfiguration process.

In another variant of these embodiments, the secondary station monitors for DCI formats with and without CIF (in UESSS) in alternating subframes until a DCI format is received with the new value of CIF. This allows the resource allocation for the RRCConnectionReconfigurationComplete message (and any retransmissions of the RRCConnectionReconfiguration message) to be transmitted whether the eNB uses Format 0 with or without CIF. It also allows cross-carrier scheduling according to the new configuration with minimal delay. This latter solution may also result under some conditions in:

Some reduction in scheduling flexibility while using alternate subframes.
Some uncertainty at the eNB on when the UE first correctly receives a DCI format with the new value of CIF. However, the eNB may continue using only every other subframe until it is sure that the UE has applied the new configuration to all subframes.

It is to be noted that the above embodiments could be applied together, and could be applied to the common search space (from the UE point of view).

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for communicating between a primary station and at least one secondary station in a network, the method comprising:
   in a secondary station:
   (a) a controller operative to search a first configuration of search spaces, the first configuration of search spaces comprising a first number of resource sets and a first number of control message formats, where at least one resource set and control message format may be selected to transmit a control message from the primary station to the secondary station,
   (b) the secondary station entering into a transitional mode in response to the receipt of a configuration message from the primary station,
   (c) the controller operative to search a second configuration of search spaces upon exiting the transitional mode, wherein the second configuration of search spaces comprises a second number of resource sets and a second number of control message formats, wherein in the transitional mode, the secondary station partly searches the first configuration of search spaces and partly searches the second configuration of search spaces.

2. A secondary station, comprising:

a transmitter including an antenna array arranged to communicate with a primary station, a controller operative to search a first configuration of search spaces, the first configuration of search spaces comprising a first number of resource sets and a first number of control message formats where at least one resource set and control message format may be selected to transmit a control message from the primary station to the secondary station, a receiver including an antenna array configured to receive a configuration message from the primary station for configuring the secondary station to enter into a transitional mode , the controller operative to configure the secondary station to enter into the transitional mode in response to the reception of the configuration message, the controller operative to configure the secondary station to search a second configuration of search spaces upon exiting the transitional mode, wherein the second configuration of search spaces comprises a second number of resource sets and a second number of control message formats, wherein in the transitional mode, the secondary station partly searches the first configuration of search spaces and partly searches the second configuration of search spaces.

3. The secondary station of claim 2, wherein the transitional mode is of a predetermined duration.

4. The secondary station of claim 2, wherein the transitional mode ends when the secondary station finds a control message addressed to the secondary station in the second configuration of search spaces.

5. The secondary station of claim 2, wherein the transitional mode ends when the secondary station receives a message confirming the use of the second configuration of search spaces.

6. The secondary station of claim 2, wherein the transitional mode comprises the secondary station searching the first configuration of search spaces in a first subset of subframes.

7. The secondary station of claim 2, wherein the transitional mode further comprises the secondary station searching the second configuration of search spaces in a second subset of subframes not included in the first subset of subframes.

8. The secondary station of claim 2, wherein the transitional mode comprises the secondary station searching only a first portion of search spaces of the first configuration of search spaces.

9. The secondary station of claim 2, wherein the transitional mode further comprises the secondary station searching only a second portion of search spaces of the second configuration of search spaces.

10. The secondary station of claim 2, wherein the transitional mode further comprises the secondary station searching only a second portion of search spaces of the second configuration of search spaces and wherein a first portion of the search spaces of the first configuration of search spaces does not overlap the second portion of the search spaces of the second configuration of search spaces.

11. The secondary station of claim 2, wherein the configuration message is transmitted by higher layer signaling.

12. The secondary station of claim 2, wherein the secondary station uses the second configuration partly in the transitional mode.

13. The secondary station of claim 12, wherein during the transitional mode, a carrier indicator flag is used in accordance with the second configuration of search spaces.

14. The secondary station of claim 2, wherein the transitional mode ends when an acknowledgement message is transmitted by a transmitter of the secondary station, the acknowledgement message indicating an acknowledgement of at least one of: the reception of the configuration message, and implementation of a reconfiguration.

15. A non-transitory computer readable storage medium comprising any storage medium that is not a transitory propagating signal or wave, and having stored thereon instructions that when executed cause processing circuitry of a secondary station to:

(a) search a first configuration of search spaces, the first configuration of search spaces comprising a first number of resource sets and a first number of control message formats, where at least one resource set and control message format may be selected to transmit a control message from a primary station to the secondary station, (b) enter into a transitional mode in response to the receipt of a configuration message, (c) search a second configuration of search spaces upon exiting the transitional mode, wherein the second configuration of search spaces comprises a second number of resource sets and a second number of control message formats, wherein in the transitional mode, the secondary station partly searches the first configuration of search spaces and partly searches the second configuration of search spaces.

* * * * *